(12) United States Patent
Minemoto et al.

(10) Patent No.: US 6,903,862 B2
(45) Date of Patent: Jun. 7, 2005

(54) ULTRAVIOLET ACOUSTOOPTIC DEVICE AND OPTICAL IMAGING APPARATUS USING THE SAME

(75) Inventors: Hisashi Minemoto, Hirakata (JP); Toshimi Nishiyama, Hirakata (JP); Kimihiko Shibuya, Minoh (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/698,221

(22) Filed: Oct. 31, 2003

(65) Prior Publication Data

US 2004/0090660 A1 May 13, 2004

(30) Foreign Application Priority Data

Nov. 5, 2002 (JP) ........................................ 2002-320893

(51) Int. Cl.⁷ ................................................. G02F 1/33
(52) U.S. Cl. ..................... 359/305; 359/312; 359/285
(58) Field of Search ............................. 359/305, 312, 359/237, 285, 290, 291, 298; 385/7

(56) References Cited

U.S. PATENT DOCUMENTS

| | | | |
|---|---|---|---|
| 3,818,129 A | * 6/1974 | Yamamoto | 348/754 |
| 4,205,348 A | 5/1980 | DeBenedictis et al. | |
| 4,610,754 A | * 9/1986 | Gaida et al. | 117/82 |
| 4,661,699 A | * 4/1987 | Welmers et al. | 250/235 |
| 4,843,335 A | * 6/1989 | Amano | 359/310 |
| 5,083,856 A | 1/1992 | Hatori et al. | |
| 5,801,389 A | * 9/1998 | Mizutani et al. | 250/548 |
| 2001/0030795 A1 | 10/2001 | Fujii et al. | |
| 2003/0007712 A1 | 1/2003 | Ross-Messemer et al. | |

FOREIGN PATENT DOCUMENTS

| | | |
|---|---|---|
| EP | 1 243 947 A2 | 9/2002 |
| EP | 1 243 947 | 9/2002 |

OTHER PUBLICATIONS

"Investigation of intracavity third–harmonic generation at 1.06 μm in YCa₄O(BO₃)₃ crystals", by C. Du et al., Applied Physics B(Laser and Optics), vol. B74, No. 2, pp. 125–127 (2002).

"Points defects in Mg–doped lithium niobate" by K.L. Sweeney et al., Journal of Applied Physics, vol. 57, No. 4, pp. 1036–1044 (1985).

"Laser scanning for semiconductor mask pattern generation" by Paul C. Allen, Proceedings of The IEEE, vol. 90, No. 10 pp. 1653–1699 (2002).

"High Performance AOTFs for the Ultraviolet" by I.C. Chang and J. Xu, 1998 IEEE Ultrasonics Symposium, pp. 1289–1292 (1998).

"Acoustoopic Deflection Materials and Techniques" by Naoya Uchida and Nobukazu Niizeki, Proceedings of the IEEE, vol. 61, No. 8, pp. 1073–1092 (1973).

\* cited by examiner

Primary Examiner—Ricky Mack
Assistant Examiner—Brandi Thomas
(74) Attorney, Agent, or Firm—Merchant & Gould P.C.

(57) ABSTRACT

The present invention provides an ultraviolet acoustooptic device including: a radio-frequency signal input part; a transducer unit for converting a radio-frequency signal into a mechanical vibration; and an acoustooptic medium whose optical characteristic varies according to the mechanical vibration. In the ultraviolet acoustooptic device, light entering the acoustooptic medium is ultraviolet light having a wavelength of 380 nm or shorter, and the acoustooptic medium is formed of an oxide single crystal containing at least boron as a component of its unit cell, a LiNbO₃ crystal, or a LiNbO₃ crystal doped with MgO. Thus, an acoustooptic device can be obtained in which no laser damage nor optical damage is caused, and an ultraviolet acoustooptic device and an optical imaging apparatus using the same can be provided that do not necessarily require to be water-cooled.

22 Claims, 2 Drawing Sheets

ULTRAVIOLET ACOUSTOOPTIC DEVICE AND OPTICAL IMAGING APPARATUS USING THE SAME

BACKGROUND OF THE INVENTION

1. Field of the Invention

The present invention relates generally to acoustooptic devices such as acoustooptic modulators, acoustooptic deflectors, acoustooptic filters, acoustooptic frequency shifters, etc. Particularly, the present invention relates to ultraviolet acoustooptic devices, such as acoustooptic modulators, acoustooptic deflectors, acoustooptic filters, acoustooptic frequency shifters, etc. that utilize ultraviolet light with a wavelength of 380 nm or shorter, and to optical imaging apparatuses using the same.

2. Related Background Art

Conventionally, a $TeO_2$ crystal or a $PbMoO_4$ crystal has been used for acoustooptic media for visible light emitted from an argon laser or a helium-neon laser. On the other hand, recently, it has been studied to combine an acoustooptic device with various types of ultraviolet sources that emit lights with shorter wavelengths, i.e. ultraviolet light, such as, for example, a YAG laser emitting third and fourth harmonics. Herein, examples of the acoustooptic device include acoustooptic modulators, acoustooptic deflectors, acoustooptic filters, acoustooptic frequency shifters, etc.

Quartz glass, a quartz crystal, a $KH_2PO_4$ (KDP) crystal, or the like has been used as a medium of a conventional acoustooptic modulator for lights within the ultraviolet range (see Non-Patent Reference 1: Proceeding IEEE Ultrasonic Sympo, Vol. 1998, pp. 1289–1292 (1998); and Non-Patent Reference 2: Proceeding of the IEEE, Vol. 61, No. 8, pp. 1073–1092 (1973)).

On the other hand, an acoustooptic device in which a $LiNbO_3$ (hereinafter referred to as "LN") crystal is used also has been reported, but it utilizes light with a wavelength of 400 nm or longer (Non-Patent Reference 2 mentioned above).

In the above-mentioned conventional acoustooptic device in which a $PbMoO_4$ crystal is used, since the absorption edge wavelength is around 410 nm in the $PbMoO_4$ crystal, light with a wavelength of 380 nm or shorter is not transmitted therethrough. On the other hand, in the conventional acoustooptic device in which a $TeO_2$ crystal is used, although the absorption edge wavelength is around 330 nm in the $TeO_2$ crystal, it is not suitable for the use in which high power is used as in the embodiments of the present invention.

Furthermore, the acoustooptic device in which quartz glass, a quartz crystal, or a KDP crystal is used delivers poor acoustooptic performance, requires a large radio-frequency power source for driving the device, and has to be water-cooled to control the heat generated therein. In the acoustooptic device in which the KDP crystal is used, it is difficult to have a moisture resistant structure since the KDP crystal is a water-soluble crystal. Moreover, since the quartz crystal is a hard crystal, it takes a considerable time for processing it when it is used as an acoustooptic medium.

It has been conceived that the acoustooptic device in which a LN crystal is used is not suitable as an acoustooptic device that handles light with a short wavelength due to optical damage and laser damage caused therein.

In this connection, the "optical damage" denotes a state where space charge is excited by light and then an electric field is generated by the space charge and thereby changes the refractive index of the crystal. Light passing through a medium with the optical damage caused therein passes through a region with its refractive index changed locally. As a result, a considerably deteriorated beam shape is observed because of the Pockels effect.

Furthermore, the "laser damage" denotes a state where the crystal is damaged physically at its surface or inner part by the influence of a strong laser beam. For instance, a strong laser beam causes ablation at the surface of a crystal to form a concave portion.

In an optical imaging apparatus using a conventional ultraviolet acoustooptic device, there have been problems in that its acoustooptic medium has to be provided with moisture resistance, heat has to be dissipated by water-cooling, and a large driving circuit is required.

SUMMARY OF THE INVENTION

Hence, the present invention provides an acoustooptic device in which no laser damage nor optical damage is caused, and is intended to provide an ultraviolet acoustooptic device and optical imaging apparatus using the same that require low driving power, allow heat to dissipate well, and thus do not necessarily require water-cooling.

An ultraviolet acoustooptic device of the present invention includes: a radio-frequency signal input part; a transducer unit for converting a radio-frequency signal into a mechanical vibration; and an acoustooptic medium whose optical characteristic varies according to the mechanical vibration. The ultraviolet acoustooptic device is characterized in that light entering the acoustooptic medium is ultraviolet light having a wavelength of 380 nm or shorter, and the acoustooptic medium is formed of an oxide single crystal containing at least boron as a component of its unit cell, a $LiNbO_3$ crystal, or a $LiNbO_3$ crystal doped with MgO.

An optical imaging apparatus of the present invention includes at least: a light source for emitting light with a wavelength of 380 nm; an ultraviolet acoustooptic device for diffracting light emitted from the light source; a driving circuit; and an image plane on which light diffracted by the ultraviolet acoustooptic device forms an image. The optical imaging apparatus is characterized in that the ultraviolet acoustooptic device includes an acoustooptic medium formed of an oxide single crystal containing at least boron as a component of its unit cell, a $LiNbO_3$ crystal, or a $LiNbO_3$ crystal doped with MgO.

DETAILED DESCRIPTION OF THE INVENTION

Figure 1:
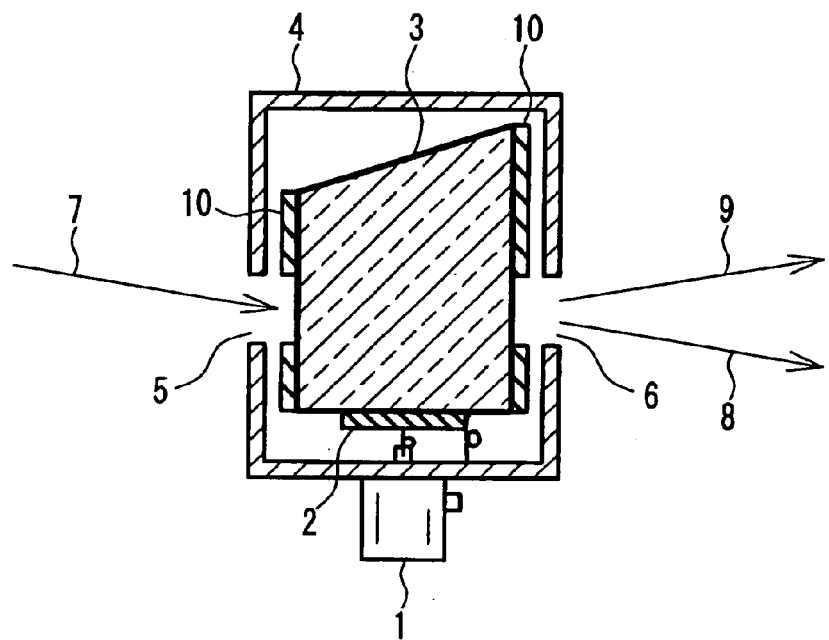
FIG. 1 is a partially cross-sectional view showing the configuration of an ultraviolet acoustooptic device according to an embodiment of the present invention.

The present invention provides an ultraviolet acoustooptic device including: a radio-frequency signal input part; a transducer unit for converting a radio-frequency signal into a mechanical vibration; and an acoustooptic medium whose optical characteristic varies according to the mechanical vibration. In the ultraviolet acoustooptic device, light entering the acoustooptic medium is ultraviolet light having a wavelength of 380 nm or shorter, and the acoustooptic medium is formed of an oxide single crystal containing at least boron as a component of its unit cell, a $LiNbO_3$ crystal, or a $LiNbO_3$ crystal doped with MgO.

It is preferable that the oxide single crystal contains at least alkali metal or alkaline-earth metal as a component of its unit cell.

It also is preferable that the oxide single crystal containing boron as a component of its unit cell is at least one of single crystals selected from a group including $Li_2B_4O_7$, $CsLiB_6O_{10}$, $LaCa_4O(BO_3)_3$, $LiB_3O_5$, $\alpha$-$BaB_2O_4$, and $\beta$-$BaB_2O_4$.

It is further preferable that the oxide single crystal may be a $Li_2B_4O_7$ or $CsLiB_6O_{10}$ single crystal.

The oxide single crystal further may contain a rare earth element as a component of its unit cell. The oxide single crystal containing a rare earth element as a component of its unit cell is $(GdY)_1Ca_4O(BO_3)_3$, $YCa_4O(BO_3)_3$, $GdCa_4O(BO_3)_3$, or the like.

The doping amount of MgO is preferably 7 mol. % or less, and further preferably 0.5 mol. % to 7 mol. %.

At least a part of the acoustooptic medium further may be covered with a high thermal conductive sheet. For example, a graphite sheet can be used as the high thermal conductive sheet.

Preferably, the light entering the acoustooptic medium has a wavelength in the range of 160 nm to 380 nm.

It is preferable that the optical imaging apparatus of the present invention further includes a movable mirror for forming an image on the image plane with the light diffracted by the ultraviolet acoustooptic device, with the movable mirror being disposed between the ultraviolet acoustooptic device and the image plane.

Furthermore, the optical imaging apparatus of the present invention further may include a beam stopper for shielding light transmitted through the ultraviolet acoustooptic device, with the beam stopper being disposed on a side where the light transmitted through the ultraviolet acoustooptic device travels. In addition, the image plane can be a photoreceptor.

The present invention employs the aforementioned configurations and thereby can provide the following effects.

(1) An acoustooptic device in which no laser damage nor optical damage is caused can be obtained by using an oxide crystal containing, particularly, boron as a component of its unit cell for the acoustooptic medium for ultraviolet light having a wavelength of 380 nm or shorter.

(2) When an oxide crystal containing, particularly, a rare earth element and boron as components of its unit cell is used for the acoustooptic medium, an increased refractive index is obtained due to the effect of the rare earth element contained therein. Accordingly, considering the short absorption edge wavelength in the acoustooptic medium, high acoustooptic performance can be expected to be obtained. Furthermore, the rare earth element contained as a component of its unit cell allows the moisture resistance and mechanical strength to further improve as compared to the case of using a material containing only alkali metal or alkaline-earth metal, and boron as components of its unit cell.

(3) A LN crystal or an oxide crystal containing boron as a component of its unit cell does not have the conventional disadvantages, such as high water-solubility of the KDP crystal and poor processability of the quartz crystal due to its considerable hardness. Accordingly, the oxide crystal is a medium that is practically easy to use. Consequently, an inexpensive ultraviolet acoustooptic device can be obtained.

(4) When a $Li_2B_4O_7$ crystal, a $(GdY)_1Ca_4O(BO_3)_3$ crystal, or a $CsLiB_6O_{10}$ crystal is used as the oxide crystal containing, particularly, boron as a component of its unit cell, a large crystal with a size of about 3 to 4 inches or 10 cm×10 cm can be utilized. This can keep the cost of the medium low.

(5) By covering the acoustooptic medium with a thermal conductive sheet, particularly a graphite sheet, the temperature of the whole crystal can be made uniform and heat can escape into the case of the acoustooptic device quickly. As a result, an ultraviolet acoustooptic device can be obtained that has temperature stability with no water cooling required therein or with an easier cooling means employed therein.

(6) With an optical imaging apparatus having an acoustooptic device in which the above-mentioned oxide crystal containing boron as a component of its unit cell, or a LN-based oxide crystal is used, an ultraviolet optical imaging apparatus that is inexpensive and has a simple configuration can be obtained through the reduction in size of the driving circuit and the improvement in water resistance and in resistance to laser damage caused by ultraviolet light.

As described above, according to the present invention, an ultraviolet acoustooptic device in which ultraviolet light can be used, no laser damage nor optical damage is caused, and the efficiency is relatively high, and an optical imaging apparatus using the same can be obtained at low cost.

Hereinafter, embodiments of the present invention are described with reference to the drawings. The present invention, however, is not limited to the following embodiments.

FIG. 1 shows a partially cross-sectional plan view of an ultraviolet acoustooptic device according to an example of the present invention. In FIG. 1, numeral 1 indicates a radio-frequency signal input part through which radio-frequency signals are inputted from outside, numeral 2 a transducer unit 2 that converts the radio-frequency signals outputted from the radio-frequency signal input part into mechanical vibrations, numeral 3 an acoustooptic medium connected to the transducer unit 2, numeral 4 a case (a housing), numeral 5 an inlet through which incident light 7 comes in, numeral 6 an outlet through which outgoing light 8 and diffracted light 9 go out, and numeral 10 a graphite sheet as an example of a thermal conductive sheet for covering the acoustooptic medium. The thermal conductive sheet 10 covers the whole side faces of the acoustooptic medium 3 except for the inlet 5 for the incident light 7 and the outlet 6 for the outgoing light 8 and diffracted light 9. With the above-mentioned components, an ultraviolet acoustooptic device is composed.

The incident light 7 has a wavelength within an ultraviolet wavelength range, specifically a wavelength of 380 nm or shorter. When this incident light 7 enters the acoustooptic medium 3 and passes through it without being subjected to any conversions, outgoing light 8 is obtained. On the other hand, when the incident light 7 enters the acoustooptic medium 3 and is diffracted through it, the diffracted light 9 is obtained. The diffraction angle of the diffracted light 9 varies with the frequency of radio-frequency signals applied to the radio-frequency signal input part 1, while the diffraction efficiency of the diffracted light 9 varies with the magnitude of the radio-frequency signals applied to the radio-frequency signal input part 1.

Conventionally, for the acoustooptic medium 3 has been used a $PbMoO_4$ crystal that is used often in the case of employing a helium neon laser (with a wavelength of 633 nm) or an argon laser (with wavelengths of 515 nm and 488 nm). It, however, is difficult to use the $PbMoO_4$ crystal in the present embodiment since the absorption edge wavelength in the $PbMoO_4$ crystal is around 410 nm and thus ultraviolet light with a wavelength of 380 nm or shorter is not transmitted therethrough. In the case of using a $TeO_2$ crystal, although the absorption edge wavelength in the $TeO_2$ crystal is around 330 nm, when high-intensity ultraviolet light enters the acoustooptic medium 3, the acoustooptic medium 3 may become unusable due to laser damage caused therein in some cases. Consequently, the $TeO_2$ crystal also is difficult to be used in the present embodiment.

On the other hand, acoustooptic devices in which a LN crystal is used for the acoustooptic medium 3 also are used as acoustooptic devices that utilize visible light having a wavelength of at least 400 nm. With the aforementioned Non-Patent Reference 2, it was described that there had been no conventional example of study to use the acoustooptic devices in which a LN crystal was used for the acoustooptic medium, as acoustooptic devices that utilize ultraviolet light with a wavelength of 380 nm or shorter. According to the present invention, it was found for the first time that even in the case of using the LN crystal, the problem of optical damage did not arise when the CW power was low, and with respect to the laser damage caused when the peak power was high, the LN crystal was subjected to less laser damage than the $TeO_2$ crystal that had been used conventionally. Moreover, it also was found for the first time that when considerations were given to the power of incident ultraviolet light, a LN crystal doped with MgO enabled an ultraviolet acoustooptic device to be obtained with the influences of optical damage and laser damage being eliminated.

In an oxide single crystal containing a large amount of boron, i.e. an oxide single crystal containing boron as a component of its unit cell, the absorption edge wavelength is in the range of 250 nm to 160 nm, and thus it transmits ultraviolet lights with short wavelengths well. The use of an oxide single crystal containing boron as an optical material results in great electronic polarization caused by delocalized electrons of the boron oxide. Accordingly, considering the short absorption edge wavelength in the oxide single crystal, a high refractive index can be obtained. Hence, it is desirable to use the oxide single crystal containing boron for the acoustooptic medium 3.

In this connection, a performance constant M2 of the acoustooptic medium is expressed as follows:

$$M2=n^6p^2/\rho v^3,$$

wherein n denotes a refractive index of the medium, p a photoelastic constant, $\rho$ a density of the medium, and v a sound velocity within the medium. Thus, a medium with a high refractive index for short wavelengths is useful as the ultraviolet acoustooptic medium.

When used together with boron, an alkali metal or alkaline-earth metal form a stable crystal material. Furthermore, like the oxide crystal containing boron in its unit cell, in an oxide crystal containing alkali metal or alkaline-earth metal in its unit cell, the absorption edge wavelength is 160 nm to 200 nm, and thus it is useful for the acoustooptic medium for ultraviolet light.

When a $Li_2B_4O_7$ crystal is used for the acoustooptic medium, a large crystal having a size of about 3 to 4 inches can be utilized and its processing is relatively easy. Accordingly, the cost of the medium can be kept down. Furthermore, since the absorption edge wavelength of the medium is around 160 nm, it also can be used as, for example, an acoustooptic medium for fifth harmonics of a YAG laser or an excimer laser.

In the same manner as in the above-mentioned case, when a $CsLiB_6O_{10}$ crystal is used for the acoustooptic medium, a large crystal having a size of about 10 cm×10 cm can be utilized, and the absorption edge wavelength of the medium is around 190 nm. Hence, it can be used as an acoustooptic medium for lights with wavelengths as short as approximate fourth harmonics of a YAG laser.

When $YCa_4O(BO_3)_3$ or $(GdY)_1Ca_4O(BO_3)_3$ is used for the acoustooptic medium, since it contains a rare earth element as a component of its unit cell, the medium can have a higher refractive index than that obtained when the medium contains only boron. As a result, the acoustooptic performance M2 can be improved. Furthermore, when only the Y element is located at the rare earth site, lights with wavelengths of up to around 220 nm are transmitted. Hence, it can be used as a medium for an acoustooptic device using, for example, fourth harmonics (a wavelength of 266 nm) of a YAG laser.

Moreover, since the acoustooptic medium with high moisture resistance is obtained due to the rare earth element contained therein, it does not require to be designed with extra considerations given to its moisture resistance when being used as an element. In addition, when it contains boron, alkali metal, and alkaline-earth metal exclusively as its main components, its hardness and thermal conductivity increase as compared to those of other acoustooptic media.

In addition, such materials used for acoustooptic media often are softer than quartz crystals and therefore can be subjected to processing such as cutting, polishing, etc. relatively easily.

When at least a part of the acoustooptic medium is covered with a thermal conductive sheet, a heat generated through the slight absorption of light or the absorption of ultrasonic waves by the crystal can be transmitted to the case efficiently. Particularly, since graphite has flexibility and thermal conductivity that is about twice as high as that of copper, it allows the heat to escape into the case efficiently and the heat in the whole acoustooptic medium to be less uneven.

Conventionally, it has been studied to stick the acoustooptic medium on a block made of a metal having high thermal conductivity. In this case, however, the reflection of ultrasonic waves caused between the acoustooptic medium and the metal became a problem in some cases.

Furthermore, when employing the above-mentioned ultraviolet acoustooptic device in which a borate-based material, LN, LN doped with MgO, or the like is used, an optical imaging apparatus can be obtained that can handle ultraviolet light, includes a simple driving circuit, and has no deliquescency.

The acoustooptic device of the present invention can utilize even ultraviolet light having a wavelength of 160 nm to 380 nm, has a light transmittance of at least 90%, causes no laser damage nor optical damage, and does not necessarily require to be water-cooled.

Next, the description is directed to an example of a method of forming a crystal according to the present invention. LN or LN doped with MgO can be made to grow using the commonly well-known Czochralski method. $Li_2CO_3$, $Nb_2O_5$, MgO, etc. that are used for preparing a raw material are mixed together at a desirable ratio and then are allowed to react with each other by calcining at 1050° C. Furthermore, the reactant that is used as a raw material is put into an Ir crucible and is heated at a temperature that is 50° C. to 200° C. higher than its melting point (around 1150° C.), for example, at 1250° C., for about 10 hours, and thereby the raw material is melted well. Subsequently, the temperature of the raw material is lowered to the temperature near its melting point, and then seeding is carried out. Thereafter, a crystal having a diameter of about 2 inches and a length of about 80 mm is made to grow in the same manner as in the common Czochralski method.

Generally, a borate-based crystal can be made to grow by the Czochralski method or a flux growth method. For example, $Li_2B_4O_7$ can be made to grow typically by the Czochralski method. The Czochralski method employed for making $Li_2B_4O_7$ grow is basically the same as that used for making LN grow except for the growth atmosphere, the growth temperature, and the crucible material. In this case, $Li_2B_4O_7$ is made to grow in an atmosphere of air while platinum is used for the crucible in general. This is because $Li_2B_4O_7$ has a lower melting point than that of LN.

Furthermore, in the case of $CsLiB_6O_{10}$, it is possible to employ, for example, a method starting from a material having a stoichiometric ratio and a self-flux method using $Cs_2CO_3$ and $Li_2CO_3$ or $B_2O_3$ as a flux. In the method using the self-flux, the growth rate slightly decreases, but a high-quality crystal can be obtained. Hence, the method using the self-flux is advantageous in obtaining a large number of crystals. Specifically, $Cs_2CO_3$, $Li_2CO_3$, and $B_2O_3$ are mixed together at a ratio of approximately 1:1:5.4. Subsequently, the mixed material is melted sufficiently at about 890° C., and then seeding is carried out at 845° C. that is the melting point of $CsLiB_6O_{10}$. Thereafter, its temperature is lowered at a rate of about 0.1–1.0° C./day as in the common flux growth method. Consequently, a crystal can be obtained that has a length of 6 cm, a width of 5 cm, and a height of 4 cm. In this case, since the growth temperature is sufficiently lower than the melting point of platinum, the crystal can be made to grow in the atmosphere of air using the platinum crucible.

EXAMPLES

The present invention is described further in detail by means of examples as follows.

Example 1

In order to examine laser damage and optical damage caused by ultraviolet light, various kinds of single crystal materials were evaluated with respect to their light resistance using a laser having a light source of third harmonics of a YAG laser. The result is shown in Table 1. The crystal materials evaluated herein were a $TeO_2$ crystal that had been used conventionally, and LN, MgO:LN, $Li_2B_4O_7$, $(GdY)_1Ca_4O(BO_3)_3$, and $CsLiB_6O_{10}$ that were used for the acoustooptic device of the present invention.

TABLE 1

| Material | Absolute Value of Laser Damage Threshold (kW/mm$^2$) | Relative Value of Laser Damage Threshold | Presence or Absence of Optical Damage |
|---|---|---|---|
| $TeO_2$ | 29 | 1 | Absent |
| LN | 87 | 3 | Present |
| MgO:LN | 57–87 | 2–3 | Absent |
| $Li_2B_4O_7$ | At least 120 | At least 4 | Absent |
| $(GdY)_1Ga_4O(BO_3)_3$ | At least 120 | At least 4 | Absent |
| $CsLiB_6O_{10}$ | At least 120 | At least 4 | Absent |

From the result, it is understood that among these materials, the $TeO_2$ crystal has the lowest relative value of the laser damage threshold and therefore is the most susceptible to the laser damage. In this case, the "laser damage" denotes the state where the crystal surface was damaged by a laser beam and a concave portion was formed at the surface. Particularly, in the case of using $TeO_2$, a metal Te was observed when the concave portion and its surrounding portion were analyzed using an X-ray microanalyzer. This conceivably is because of cleavage of chemical bonds caused by absorption of strong ultraviolet light and heat. Consequently, the $TeO_2$ crystal is not suitable for the use in which high power is used. LN and MgO:LN showed the laser damage thresholds that are about twice to triple as high as that of $TeO_2$. Regarding MgO:LN, the amount of MgO used therein was preferably in the range of 0.5 to 7 mol. %, and an acoustooptic medium made of MgO:LN containing more than 7 mol. % of MgO as a dopant was considerably susceptible to laser damage. In the $Li_2B_4O_7$ crystal, the $(GdY)_1Ca_4O(BO_3)_3$ crystal, and the $CsLiB_6O_{10}$ crystal, the laser damage threshold was at least four times as high as that of the $TeO_2$ crystal, and no damage was measured in this evaluation.

The above-mentioned results showed that LN, MgO:LN, and oxide single crystals containing boron as the main component have higher damage thresholds than that of the $TeO_2$ crystal that has been used conventionally.

Next, the acoustooptic media made of the above-mentioned materials were evaluated with respect to the optical damage. The evaluation was carried out under the conditions that an argon laser was used as a light source, and the laser intensity at the sample position was 1.8 kW/mm$^2$. As is known conventionally, optical damage (the distortion in a beam pattern) was found in the acoustooptic medium made of the LN crystal that was not doped with MgO. No optical damage, however, was found under the same conditions in the acoustooptic media made of the $TeO_2$ crystal, the MgO:LN crystal, the $Li_2B_4O_7$ crystal, the $(GdY)_1Ca_4O(BO_3)_3$ crystal, and the $CsLiB_6O_{10}$ crystal. As the result of the optical damage, the laser beam pattern was deformed considerably into an ellipse or was not uniform.

As described above, among LN crystals, particularly a LN crystal doped with MgO is subjected to less optical damage. Hence, a LN crystal doped with 0.5 to 7 mol. % of MgO that is subjected to less optical damage as well as less laser damage conceivably is suitable for the acoustooptic medium. Since no optical damage was found in the $Li_2B_4O_7$ crystal, the $(GdY)_1Ca_4O(BO_3)_3$ crystal, and the $CsLiB_6O_{10}$ crystal, they are considered to be adaptable to both the case where peak power is high and the case where continuous light is used.

Next, ultraviolet acoustooptic devices like the one shown in FIG. 1 were produced using various acoustooptic media, and the acoustooptic effects of the various acoustooptic media were checked. In this case, the acoustooptic performance is not always reflected as it is since the acoustic impedances of the transducer unit 2 and the acoustooptic medium 3 and the electrical impedances of the radio-frequency signal generator and the transducer unit 2 were not optimized. However, when using third harmonics of a pulsed NdYAG laser with a wavelength of 355 nm that was employed as a light source, the diffraction efficiency was about 5% to 20% as shown in Table 2, with the power of incoming radio-frequency signals being 2 to 3 W. Furthermore, in this case, the acoustooptic devices did not require to be water-cooled or the like.

Particularly, by covering the acoustooptic media with a thermal conductive sheet, it was possible to obtain ultraviolet acoustooptic devices in which no defocus nor drift of laser beams occurs. In this connection, a graphite sheet was particularly useful as the thermal conductive sheet since it had a thermal conductivity that was twice that of copper.

TABLE 2

| Material | Diffraction Efficiency (%) |
|---|---|
| LN | 20 |
| MgO:LN | 20 |
| $Li_2B_4O_7$ | 5 |
| $(GdY)_1Ga_4O(BO_3)_3$ | 6 |
| $CsLiB_6O_{10}$ | 5 |

It is to be understood that an impedance matching circuit may be provided between the radio-frequency signal generator and the transducer unit 2, although it was not used here.

Example 2

Acoustooptic devices like the one shown in FIG. 1 were produced and their acoustooptic performance was evaluated as in Example 1 using a GaN-based LED that emitted light having a wavelength in the range of 360 nm to 380 nm. The LED used herein had a maximum output of about 2 mW.

In this case, the diffraction efficiency was about 4% to 15% as shown in Table 3, with the input power of an RF signal being 2 W. The reason why the diffraction efficiency decreased as compared to that in Example 1 conceivably is that the wavelength of the incident light was slightly longer and the monochromaticity of the light source was poorer. When using the incident light having power in this range, no optical damage was found even in the case of using a common LN single crystal.

TABLE 3

| Material | Diffraction Efficiency (%) |
|---|---|
| LN | 15 |
| MgO:LN | 15 |
| $Li_2B_4O_7$ | 4 |
| $(GdY)_1Ga_4O(BO_3)_3$ | 5 |
| $CsLiB_6O_{10}$ | 4 |

Example 3

Acoustooptic devices like the one shown in FIG. 1 were produced and their acoustooptic performance was evaluated with respect to fourth harmonics of a YAG laser having a wavelength of 266 nm. In this case, it was not possible to use LN and MgO:LN for the acoustooptic devices since they do not transmit ultraviolet light having a wavelength of 266 nm. The diffraction efficiency of the acoustooptic devices produced using the $Li_2B_4O_7$ crystal, the $(GdY)_1Ca_4O(BO_3)_3$ crystal, and the $CsLiB_6O_{10}$ crystal was 6% to 8% as shown in Table 4. In addition, deteriorations in transmittance and beam pattern were not found even after these acoustooptic devices were irradiated with ultraviolet light having a wavelength of 266 nm for 10 hours continuously.

TABLE 4

| Material | Diffraction Efficiency (%) |
|---|---|
| LN | — |
| MgO:LN | — |
| $Li_2B_4O_7$ | 6 |
| $(GdY)_1Ga_4O(BO_3)_3$ | 8 |
| $CsLiB_6O_{10}$ | 7 |

With respect to the $(GdY)_1Ca_4O(BO_3)_3$ crystal, in the case of using light having a wavelength of 266 nm, higher light transmittance was obtained when $YCa_4O(BO_3)_3$ in which light absorption by Gd is reduced or a composition hardly containing Gd was used.

Example 4

Figure 2:
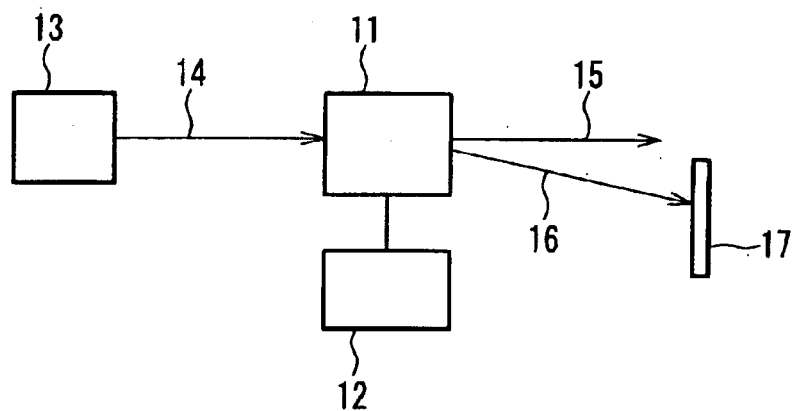
FIG. 2 is a diagram illustrating the configuration of an optical imaging apparatus according to Example 4 of the present invention.

An optical imaging apparatus according to the present example is described with reference to FIG. 2. Light emitted from a light source 13 enters an ultraviolet acoustooptic device 11. Numeral 14 denotes incident light. The basic configuration of the ultraviolet acoustooptic device is the same as that shown in FIG. 1. Transmitted light 15 and diffracted light 16 modulated according to signals sent from a driving circuit 12 go out from the ultraviolet acoustooptic device 11. Generally, the diffracted light 16 is used that provides a high extinction ratio (i.e. a big difference between a state where light is ON and a state where light is OFF). However, only the transmitted light 15, or both the transmitted light 15 and the diffracted light 16 can be used depending on the intended use. The diffracted light reaches an image plane 17 to form an image or a line corresponding to the signals sent from the driving circuit 12.

A GaN-based semiconductor laser (with a wavelength of 380 nm and an output of 10 mW) was used as the light source 13. As the medium of the acoustooptic device 11 was used a LN crystal doped with MgO or a $(GdY)_1Ca_4O(BO_3)_3$ crystal. In this case, since the optical power is low, it can be used as, for example, a light source of a laser microscope or a light source of a laser printer. When using it as the light source of a laser microscope, a smaller focal spot can be formed and improved resolution can be obtained as compared to the general case where visible light is used. Furthermore, the kind of a material can be identified by observing the fluorescence at the image plane (in this case, a sample plane).

Moreover, when using it for a laser printer, a higher resolution laser printer can be obtained.

Example 5

Figure 3:
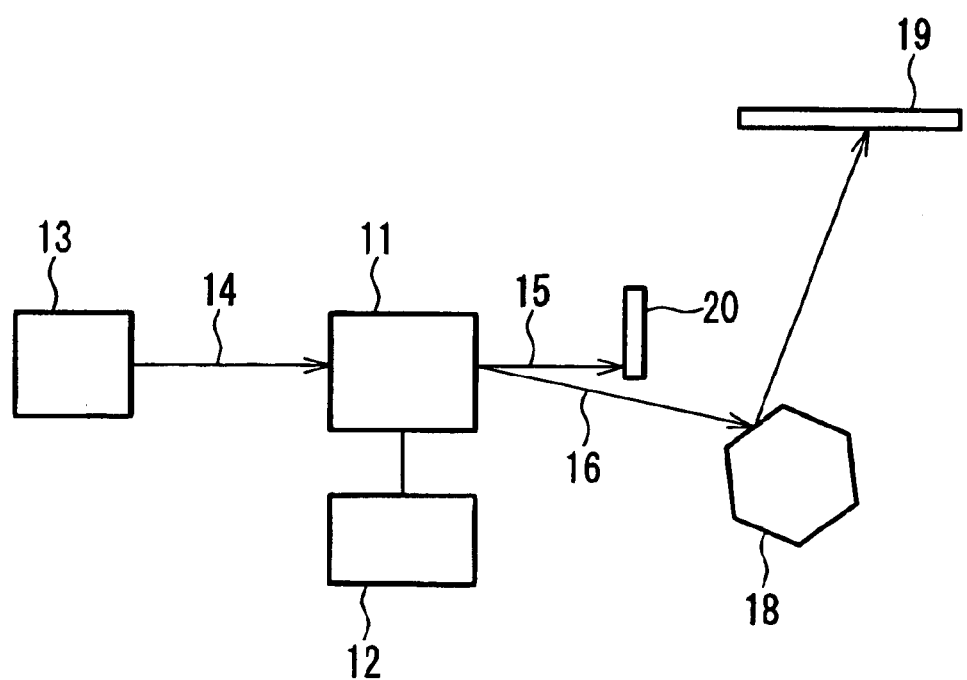
FIG. 3 is a diagram illustrating the configuration of an optical imaging apparatus according to Example 5 of the present invention.

An optical imaging apparatus according to the present example is described with reference to FIG. 3. Light emitted from a light source 13 enters an ultraviolet acoustooptic device 11. Numeral 14 denotes incident light. Transmitted light 15 and diffracted light 16 modulated according to signals sent from a driving circuit 12 go out from the ultraviolet acoustooptic device 11. In this case, since the diffracted light 16 is used, the transmitted light 15 to be stray light in the device is shielded with a beam stopper 20. The diffracted light 16 is reflected by a movable mirror 18 to form an image on an image plane 19.

In this example, third harmonics of a YAG laser employed as the light source were used, and its average output was 0.5 W. A polygon mirror was used as the movable mirror 18. $CsLiB_6O_{10}$ was used for the acoustooptic medium. In this case, the average output of the light source 13 is high and the light can be deflected at a large angle by the movable mirror 18. Hence, it can be used, for instance, for direct drawing on a printed board or as a light source of a laser display. When using it as a device for direct drawing on a printed board, the device is characterized in an improved resolution and a reduced cost of photoresist as a photorecepter.

Furthermore, in the case of using it as a light source of a laser display, when phosphors as a photorecepter corresponding to red, green, and blue are applied to the image plane 19, a laser display can be obtained in which the phosphors are excited by ultraviolet light. Since the laser beam projected directly to a display is not viewed but the red, green, and blue lights of phosphors excited on the image plane 19 are viewed, a speckle noise, which is an disadvantage of a laser display, is not produced.

As described above, according to the present example, an acoustooptic device can be obtained that utilizes ultraviolet light having a wavelength of 380 nm or shorter. In addition, an ultraviolet acoustooptic device can be obtained in which no optical damage nor laser damage is caused.

The aforementioned embodiments were described using the $Li_2B_4O_7$ crystal, the $(GdY)_1Ca_4O(BO_3)_3$ crystal, and the $CsLiB_6O_{10}$ crystal as various oxide crystals containing boron. It, however, is to be understood that other crystals also can be used including $LaCa_4O(BO_3)_3$, $LiB_3O_5$, $\alpha\text{-}BaB_2O_4$, and $\beta\text{-}BaB_2O_4$ crystals.

Furthermore, in the above, the acoustooptic modulator was described as an example of the acoustooptic device. The acoustooptic device, however, can be used as an acoustooptic device using light with a wavelength of 380 nm or shorter such as an acoustooptic light deflector, an acoustooptic filter, an acoustooptic frequency shifter or the like.

Moreover, it is not always necessary for the optical imaging apparatus to form a particular image or line on the image plane. It can be used as an apparatus such as, for example, a laser microscope in which the whole image plane is irradiated.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An ultraviolet acoustooptic device, comprising:
   a radio-frequency signal input part;
   a transducer unit for converting a radio-frequency signal into a mechanical vibration; and
   an acoustooptic medium whose optical characteristic varies according to the mechanical vibration,
   wherein light entering the acoustooptic medium is ultraviolet light having a wavelength of 380 nm or shorter, the acoustooptic medium is formed of an oxide single crystal containing at least boron as a component of its unit cell, and the acoustooptic medium transmits ultraviolet light therethrough.

2. The ultraviolet acoustooptic device according to claim 1, wherein the oxide single crystal contains at least alkali metal or alkaline-earth metal as a component of its unit cell.

3. The ultraviolet acoustooptic device according to claim 1, wherein the oxide single crystal containing at least boron as a component of its unit cell is at least one of single crystals selected from a group including $Li_2B_4O_7$, $CsLiB_6O_{10}$, $LaCa_4O(BO_3)_3$, $LiB_3O_5$, $\alpha\text{-}BaB_2O_4$, and $\beta\text{-}BaB_2O_4$.

4. The ultraviolet acoustooptic device according to claim 3, wherein the oxide single crystal is a $Li_2B_4O_7$ or $CsLiB_6O_{10}$ single crystal.

5. The ultraviolet acoustooptic device according to claim 1, wherein the oxide single crystal further contains a rare earth element as a component of its unit cell.

6. The ultraviolet acoustooptic device according to claim 5, wherein the oxide single crystal containing a rare earth element as a component of its unit cell is at least one single crystal selected from a group including $(GdY)_1Ca_4O(BO_3)_3$ and $YCa_4O(BO_3)_3$.

7. The ultraviolet acoustooptic device according to claim 1, wherein at least a part of the acoustooptic medium further is covered with a high thermal conductive sheet.

8. The ultraviolet acoustooptic device according to claim 7, wherein the high thermal conductive sheet is a graphite sheet.

9. The ultraviolet acoustooptic device according to claim 1, wherein the light entering the acoustooptic medium is ultraviolet light having a wavelength in a range of 160 nm to 380 nm.

10. An optical imaging apparatus, comprising:
    a light source for emitting light with a wavelength of 380 nm or shorter;
    an ultraviolet acoustooptic device for diffracting light emitted from the light source;
    a driving circuit; and
    an image plane on which light diffracted by the ultraviolet acoustooptic device forms an image,
    wherein the ultraviolet acoustooptic device includes an acoustooptic medium formed of an oxide single crystal containing at least boron as a component of its unit cell, and the acoustooptic medium transmits ultraviolet light therethrough.

11. The optical imaging apparatus according to claim 10, wherein the oxide single crystal contains at least alkali metal or alkaline-earth metal as a component of its unit cell.

12. The optical imaging apparatus according to claim 10, wherein the oxide single crystal containing at least boron as a component of its unit cell is at least one of single crystals selected from a group including $Li_2B_4O_7$, $(GdY)_1Ca_4O(BO_3)_3$, $CsLiB_6O_{10}$, $YCa_4O(BO_3)_3$, $LaCa_4O(BO_3)_3$, $LiB_3O_5$, $\alpha\text{-}BaB_2O_4$, and $\beta\text{-}BaB_2O_4$.

13. The optical imaging apparatus according to claim 10, further comprising a movable mirror for forming an image on the image plane with the light diffracted by the ultraviolet acoustooptic device, with the movable mirror being disposed between the ultraviolet acoustooptic device and the image plane.

14. The optical imaging apparatus according to claim 10, wherein at least a part of the acoustooptic medium further is covered with a high thermal conductive sheet.

15. The optical imaging apparatus according to claim 10, wherein the high thermal conductive sheet is a graphite sheet.

16. The optical imaging apparatus according to claim 10, further comprising a beam stopper for shielding light transmitted through the ultraviolet acoustooptic device, with the beam stopper being disposed on a side where the light transmitted through the ultraviolet acoustooptic device travels.

17. The optical imaging apparatus according to claim 10, wherein the image plane is a photoreceptor.

18. The optical imaging apparatus according to claim 17, wherein phosphors are used as the photoreceptor for the image plane.

19. The optical imaging apparatus according to claim 18, wherein phosphors corresponding to red, green, and blue are used as the photoreceptor for the image plane.

20. The optical imaging apparatus according to claim 10, wherein the light source emits light with a wavelength in a range of 160 nm to 380 nm.

21. A method for diffracting ultraviolet light by an ultraviolet acoustooptic device, the device comprising:

a radio-frequency signal input part;

a transducer unit for converting a radio-frequency signal into a mechanical vibration; and an acoustooptic medium whose optical characteristic varies according to the mechanical vibration, the medium being formed of an oxide single crystal containing at least boron as a component of its unit cell, wherein the acoustooptic medium transmits ultraviolet light therethrough, the method comprising:

allowing ultraviolet light having a wavelength of 380 nm or shorter to enter the acoustooptic medium; and applying a radio frequency to the radio-frequency signal input part so that the ultraviolet light is diffracted.

22. The method according to claim 21, wherein the ultraviolet light has a wavelength in a range of 160 nm to 380 nm.

* * * * *